Apr. 10, 1923.

H. P. KRAFT 1,451,025

VULCANIZING VALVE

Filed Sept. 20, 1918.

WITNESS:
René Bruine

INVENTOR:
Henry Phillip Kraft
By Attorneys,
Fraser, Burk & Myers

Patented Apr. 10, 1923.

1,451,025

UNITED STATES PATENT OFFICE.

HENRY PHILLIP KRAFT, OF RIDGEWOOD, NEW JERSEY.

VULCANIZING VALVE.

Application filed September 20, 1918. Serial No. 254,903.

*To all whom it may concern:*

Be it known that I, HENRY PHILLIP KRAFT, a citizen of the United States of America, residing in Ridgewood, in the county of Bergen and State of New Jersey, have invented certain new and useful Improvements in Vulcanizing Valves, of which the following is a specification.

The invention has to do with vulcanizing valves, such as are employed in manufacturing processes for pneumatic tires and similar articles, and its object is to afford a simple, practicable and durable construction.

During the vulcanizing process in the making of tires, it is usual to inflate the tire under a comparatively high pressure and to hold such pressure without any diminution, for a definite length of time, a quantity of water being injected during inflation and vaporized during the succeeding vulcanizing operation. The excessive pressures and the intense heat of vulcanization cause rapid deterioration of the valve, with the result that its engagement with the seat soon becomes irregular and leakage occurs.

A more particular purpose of the improvement is to provide a valve structure which will stand up satisfactorily under the necessary strains, and also affording an absolutely air-tight closure.

The present structure is designed to accomplish this, in a general way, by mounting the valve upon its stem through the instrumentality of a swivelled connection. The supporting stem, which is hollow, is preferably bifurcated at the end, affording a plurality of lips, of which there may be two or more. These are bent inwardly toward the center of the valve stem, into engagement with a reduced portion formed on the valve proper. By this rotary relationship between the valve and its supporting stem, a uniform wearing action is obtained and a tight joint with the valve seat is practically insured.

The construction also makes it possible to renew the valve after it has become worn, with comparatively little difficulty and at an inconsiderable cost.

To these and other ends, the invention consists in certain improvements and combinations of parts as will be hereinafter more fully described and pointed out in the claims at the end of the specification.

Referring to the drawings,—

In the present embodiment of the invention, the valve structure includes a body portion A which is adapted to be secured to a rubber tire or casing in the usual manner, and has a separate end or housing B. The latter is threaded upon the end of the body A and held in rigid engagement therewith by a flange C which is spun or bent inwardly with respect to a shoulder D formed upon the body A. This affords an extremely simple and practicable way of manufacturing the body and valve housing.

Figure 2:
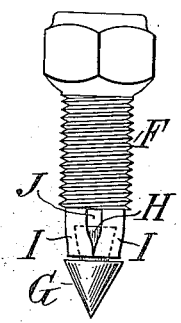
Fig 2 is a side elevation of the valve, removed from the housing.
Figure 1:
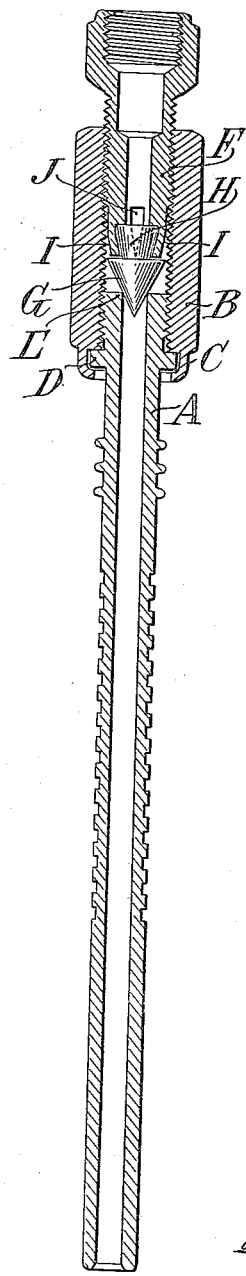
Figure 1 is a sectional view illustrating a preferred form of the invention.
Figure 4:
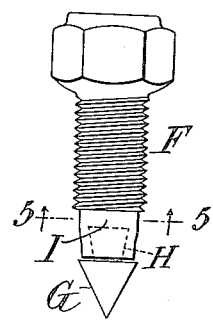
Fig. 4 is a side elevation of the valve taken at right angles to the direction of Fig. 2.
Figure 3:
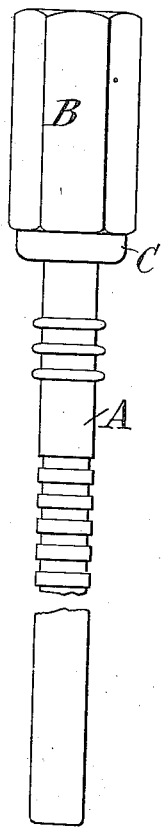
Fig. 3 is a side elevation of the housing that receives the valve.
Figure 5:
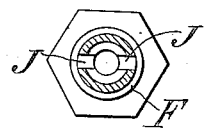
Fig. 5 is a horizontal sectional view on line 5—5 of Fig. 4.

The body A is provided at its end with the valve seat E which co-operates with the valve member that is threaded within the housing B. The valve member includes a hollow stem F through which air is adapted to pass from a suitable source of pressure, and a valve G which is held in swivelled relation upon the hollow stem F. The valve G is a point or tip formed of metal, preferably of tapered contour to engage the seat E and is provided with a reduced end or retaining portion H which is of greater diameter at its outer end than at its inner portion or base. The retaining part H is adapted to be engaged by means upon the stem F, so as to hold the valve while permitting rotative movement upon its support. To accomplish this, the stem F is split to afford a plurality of lips I, two of which are shown in the present disclosure, although more may be employed if desirable. The lips I are constructed by cutting away the stem at opposite points, and these cut-away portions extend beyond the limit of the valve and are of sufficient width to provide openings J, communicating with the interior of the stem, shown in Figs. 1 and 2, through which air can pass readily from the stem F around the valve G. The lips I are bent inwardly to embrace the reduced retaining portion H on the valve, the extreme ends of the lips I being preferably brought into substantial engagement with each other, as shown in Fig. 2, although this is not absolutely necessary, as long as the lips function to hold the valve G upon the stem F and permit a free rotative action.

The valve is closed by turning the stem F within the housing B, bringing the valve G into close relationship with the port or seat E. Any wear incurred by the valve, owing to frequent and repeated operations, is uniformly distributed over the valve surface and the valve is reasonably certain of being brought into air-tight relationship with its seat, owing to the swivelled support which permits turning of the valve relative to the tubular stem. This arrangement also permits of renewing the valve by forcing the lips I outwardly, so that if the valve wears to such an extent that it is inoperative, only the tip or point requires replacement. A further advantage of the structure resides in the possibility of making the body A and end portion B separately instead of in one piece, thereby making it easier to construct and machine the interior parts.

While the disclosure of this application represents a preferred arrangement of the invention, it is not limited to the precise details or arrangements set forth, but may be modified in various ways, without departing essentially from the spirit of the invention or the contemplated scope of the appended claims.

What I claim is:—

1. A vulcanizing valve or the like, comprising a tubular valve stem provided at one end with a coupling connection and at its other end with a valve member swiveled thereto so that the valve is adapted for only relative rotational movement with respect to the stem.

2. A vulcanizing valve or the like, comprising a tubular valve stem provided at one end with a coupling connection and at its other end with a valve member swiveled thereto so that the valve is adapted for only relative rotational movement with respect to the stem, said valve member having a substantially non-deformable seating face.

3. A vulcanizing valve or the like, comprising a valve seat, a valve, and a tubular stem having a plurality of lips formed by slitting the end of the stem, engaging a part of the valve and providing a swiveled connection therewith.

4. A vulcanizing valve or the like, comprising a valve seat, a valve provided with a reduced portion, and a tubular stem having a plurality of inwardly bent lips adjacent one end, engaging over said reduced portion on the valve.

5. Valve mechanism comprising a valve seat, a valve provided with a reduced and outwardly flaring retaining portion, and a hollow stem having a plurality of inwardly bent lips engaging said reduced portion, the stem having openings between said lips communicating with is interior to provide for the passage of a fluid through its interior.

6. Valve mechanism comprising a valve seat, a valve provided with a reduced and outwardly flaring retaining portion, and a hollow stem split at its end to afford opposite lips which are cut away along their adjacent edges, the outer ends of the lips being bent inwardly toward each other to engage said reduced portion of the valve, and affording openings between the inner ends of the lips communicating with the interior of the stem.

7. A vulcanizing valve or the like, comprising a body portion and a housing threaded one upon the other and held in such position against relative rotation by retaining means on one of said members overlying a shoulder on the other, a valve seat in the body portion, and a valve threaded in the housing and movable relatively thereto to engage the seat aforementioned.

8. A vulcanizing valve or the like, comprising a valve seat, a hollow valve stem, and a conical valve member having a swivelled connection with the stem so that the valve member is adapted for only relative rotational movement with respect thereto, the stem having lateral openings in its walls communicating with its interior to provide for the passage of a fluid through the interior.

In witness whereof, I have hereunto signed my name.

HENRY PHILLIP KRAFT.